Sept. 10, 1968            A. L. RENKEY            3,401,226
INDUCTION FURNACE HAVING A COMPOSITE LINING
COMPOSED OF REFRACTORY BRICK
Filed Oct. 24, 1965
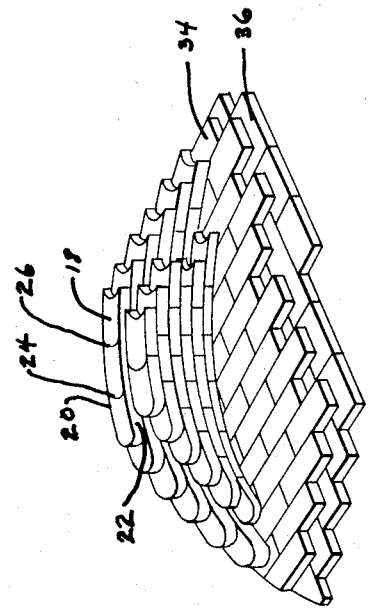
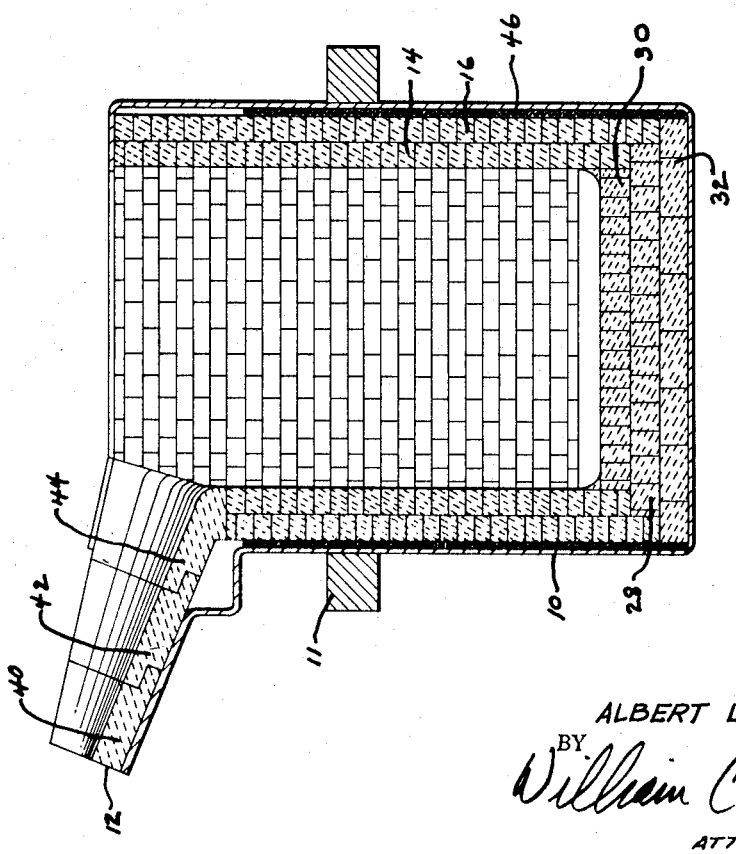
INVENTOR.
ALBERT L. RENKEY
BY
ATTORNEY United States Patent Office 3,401,226
Patented Sept. 10, 1968

3,401,226
INDUCTION FURNACE HAVING A COMPOSITE
LINING COMPOSED OF REFRACTORY BRICK
Albert L. Renkey, Bethel Park, Pa., assignor to Dresser
Industries, Inc., Dallas, Tex., a corporation of Delaware
Filed Oct. 24, 1965, Ser. No. 504,887
The portion of the term of the patent subsequent
to Oct. 17, 1984, has been disclaimed
5 Claims. (Cl. 13—35)

ABSTRACT OF THE DISCLOSURE

An induction furnace construction consisting of an outer metal shell, a primary coil disposed adjacent the interior surfaces of the shell and a composite lining of refractory material, said lining being composed of a plurality of circular brick which are laid up in the form of rings.

Induction furnaces in the United States are growing rapidly both in numbers and capacity, particularly in the ferrous metal working industry. This growth has come after a dormant period of almost three generations, and has resulted from : (1) a great demand for clean, closely controlled products as steel enters its second century, and (2) marked improvements in the equipment and materials required for economic induction furnace operation. When I state that induction furnace art growth has had a dormant period of approximately three generations, I do not wish to infer that there have not been minor improvements in induction furnace construction, nor that induction furnaces have not been used. However, there has been no revolutionary modification of induction furnace construction practices, as far as I know, for many years.

One of the rather startling developments in induction furnace practice has been the marked trend towards considerably larger vessels; for example, to furnaces of over 200 tons' capacity. Of course, this recent marked trend towards considerably larger vessels and more automated and superior control arrangements has had a serious effect on refractories previously used to line such furnaces. One result has been use of higher purity refractory materials; but even this had not been the complete answer.

To better understand the change which is now taking place, one has now but to refer to the older patent art; for example, Patent No. 2,008,732, of D. L. Summey, which teaches method and apparatus for fabrication of a rammed induction furnace lining. Rammed linings previously have been considered the most desirable form of construction for an induction furnace. A rammed lining has been considered desirable, because it was monolithic in character, i.e., there were no cracks or joints through which molten metal could penetrate to coils, cooling conduits, and the like. The marked propensity of many ramming mixes to shrink has also been considered desirable because this provided a more dense, impervious, lining structure.

However, in very large vessels, monolithic linings have just not been as satisfactory as desired. Not only have the labor and materials requirements for the formation of monolithic linings been extremely distasteful but, for some unknown reason, there appears to be greater propensity in these larger vessels for the rammed monolith to crack and in other ways rapidly deteriorate.

Accordingly, it is the primary object of this invention to provide improved induction furnace construction practices, and to provide an improved induction furnace.

Refractory linings, in any type of furnace, should have the ability to chemically and physically resist deterioration in service. Chemical resistance is accomplished by judicious selection of refractory ingredients. For example, basic refractory, such as dead burned periclase or magnesia, is used to fabricate the refractory lining when a chemically basic service environment is expected. Non-basic or acid-type refractory is selected when an acid environment is expected; for example, a high alumina refractory. "High alumina" is understood by those skilled in the art to infer $Al_2O_3$ containing materials containing at least about 50%, by weight, of $Al_2O_3$.

Physical properties or characteristics desirable in the refractory lining to provide optimum service include ability to resist penetration by molten metals and slags, ability to resist attack and penetration by effluent gases, ability to resist rapid and wide cyclic variation in temperature without spalling or cracking, etc. Volume stability, i.e., shrinkage or expansion due to change in the mineralogical character of the refractory when exposed to service temperatures, is also an important consideration.

Briefly, all of the foregoing desirable chemical and physical characteristics are provided according to one aspect of this invention by a novel combination of preformed, burned, refractory shapes and a coreless induction furnace shell. The lining, in essence, consists of two adjacent walls of refractory. A first wall is placed contiguous to the inner surface of the metal shell which defines the furnace. It is a "backup" wall. A second inner or working wall or lining is built over the previously laid backup wall. Further, the two walls are so built that joints between bricks are not in direct communication, from one wall to the other, to any appreciable extent.

I have found it very desirable to omit any insulation between the two walls as this provides a very steep thermal gradient. With such an arrangement, the backup wall is almost permanent in character, not normally being exposed to the drastic chemical and physical process parameters of the induction furnace.

In the preferred construction, the backup wall is made of a plurality of substantially identical, circle brick which are laid up in the form of rings. These brick have substantially parallel top and bottom faces, opposite cylindrically curved sides of substantially equal radius of curvature, but respectively concave and convex and arcuate ends respectively concave and convex. Each ring consists of the necessary plurality of identical shapes laid on one of their larger flat surfaces wherein they are mated to provide an interlocking structure. The shapes are generally 9" long and 4½" wide. The thickness of the shapes usually is 1½", 2½" or 3". The inner lining is also fabricated of the above described circle brack. Generally, both linings will be constructed with 3" thick shapes. However, the first layer of the inner lining should be constructed with shapes of lesser thickness. Such an arrangement precludes horizontal joint communication between the two walls. Vertical joint communication is prevented by staggering the joints with respect to the backup lining as is well known in the art. Penetration of the joints with molten metal is further reduced by the brick design (arcuate ends) which are mated with adjacent brick. Thus, instead of having straight line joints through both linings, the joints define sinuous paths.

In laying up the brick a mortar is not necessary because of the interlocking arrangement. However, a dip coat of mortar may be employed for assurance. A suitable dip coat material which may be used with high alumina brick is disclosed and claimed in Ser. No. 177,305, entitled "Refractory Bonding Mortar," by J. L. Dolph, filed Mar. 5, 1962, owned by the same assignee as the present invention. For basic brick, I would suggest a silicate bonded periclase or chrome ore mortar.

Another interesting discovery is that the limited expansion which occurs in most of the burned refractory brick I suggest in my furnace construction is a desirable thing. According to the prior art, castables and ramming mixes have been used because shrinkage has been considered necessary to provide a more dense and impervious structure. I find that the limited expansion obtained by the individual brick units in my furnace construction tighten up the lining.

The preferred brick for construction of an induction furnace lining according to this invention which is to be nonbasic in service is of the type disclosed and claimed in United States Patent No. 3,067,050, of Eldon D. Miller, Jr., entitled, "Alumina Refractories." Such brick can be used for both the backup and working wall or lining. For a basic environment, I suggest brick of the type disclosed and claimed in United States application Ser. No. 212,992, of Ben Davies and Frank H. Walther, Jr., filed July 27, 1962. Still further, if desired, one of these two types of brick can be used for the backup and the other for the working lining. One might expect the different mineralogical character of the two brick would make them incompatible. Due to the very desirable thermal gradient mentioned above, however, such is not the case.

Another excellent brick for use in basic environments (and especially with low Fe, high nickel-cobalt alloys) is H-W's "Magnel" brand, a magnesium aluminate spinel-bonded, high-purity, magnesite refractory.

Summarizing the advantages of my construction:

(1) The all-brick or preformed circle brick linings are much safer, because the sinuous joints do not allow penetration of molten metal.

(2) Workmanship in the plant is superior. The many problems of obtaining a uniformly dense, substantially homogenous structure with ramming mixes is overcome when one uses more carefully preformed, burned brick.

(3) The range of materials (from the metallurgical standpoint) which can be treated in an induction furnace, is increased. Refractoriness and strength of ramming mixes has delimited the metallurgy of induction furnaces. However, by use of my lining construction, a wide range of burned refractory brick, as far as chemistry, refractoriness, and strength are concerned, can be used, considerably broadening the horizon of possible metallurgical systems which can be treated in an induction furnace.

(4) Since the backup wall is more or less a permanent installation, even with equal service life comparing a prior rammed lining and the present construction, there is on the order of 40–50% savings in refractory volume, since only a working lining has to be replaced; and it is easily removed after a service campaign; whereas, with prior art rammed constructions, the whole mass of monolith had to be removed.

(5) Since the original cost of ramming mixes and brick is roughly the same, or even higher for the ramming mix, particularly in view of the specialized labor required, my novel approach provides a 70–80% reduction of refractory cost, at least based on present service experiments.

A further understanding and appreciation of the present invention will be had by reference to the appended drawings. In these drawings:

FIG. 1 is a schematic, sectional, side elevation of a coreless induction furnace fabricated according to the techniques of this invention;

FIG. 2 is a perspective view of a portion of the furnace lining according to this invention.

Before describing the drawings in detail, it should be understood they are but exemplary of preferred practices according to the invention, and that the true spirit and scope of the invention is not to be limited thereto but, rather, as defined in the hereafter appended claims.

With reference to the drawings in which like numerals are used to designate like parts, in FIG. 1, I show an induction furnace containing the novel, composite refractory lining. The metal shell 10 is carried in the ring 11, which ring has opposed knobs or lugs engaged in opposed arms (not shown). The arms are secured to an axle whereby to rotate the furnace for pouring. As is conventional, a trough 12 allows for pouring of a stream of molten metal from the vessel.

The lining itself, consists of two walls or layers of refractory brick (see FIG. 2). The inner layer 14 and backup layer 16 is comprised of a plurality of substantially identical shapes laid in concentric rings. The shapes have substantially parallel top faces 18 and bottom faces (not shown). They have opposite cylindrically curved sides 20 and 22 of substantially equal radius of curvature but respectively concave and convex. The concave side 20 is shorter in length that the convex side 22. The brick also contain arcuate ends 24 and 26 in which the radius of curvature is substantially identical. The arcuate ends define arcs of circles having their centers on the same side of the center line which is equidistant from the sides 20 and 22.

In FIG. 1, I have shown the bottom to be constructed of three courses 28, 30, and 32. However, two courses, 34 and 36, as shown in FIG. 2, may also be employed. Composition corresponds to the backup and working lining. The trough 38 is shown lined with three interlocking special shapes 40, 42, and 44, of generally upwardly opening arcuate configuration. These shapes should be made of a refractory compatible with that used for the working linings. If desired, a castable or ramming mix could be used to line the trough, but I suggest the preformed shapes for best results.

To complete the description of FIG. 1, I have shown a primary coil 46 disposed between the outer shell 10 and the backup lining 16. In operation, current is applied to the primary coil which induces a current in the molten metal or charge which serves as the secondary. This induced current rapidly heats contained metal to a homogenous charge.

According to good practices, I suggest that the primary coil be coated with a mortar of a refractory compatible with the refractory used in the backup lining.

As indicated in FIG. 2, the bottom-most course 29 and the bottom of the outer wall rest on the same supporting surface. The second course is built within the outer wall and supports the bottom of the working lining. The topmost working course of the bottom is built within the confines of the working lining. In preferred practice, I suggest a fillet 48 be formed with mortar or a castable at the exposed joint between the working lining and the upper or working course of the bottom.

In the foregoing, I have only mentioned three specific types of brick as suited for the practice of this invention. There are many other types of good quality refractory brick which can be used. For example, good quality brick fabricated of such as chrome ore, olivine, forsterite, zircon, zirconia, silicon carbide, and fused shapes of such as alumina, magnesia, chrome ore-magnesia, magnesia-chrome ore, alumina, alumina-zircon, alumina-zirconia, and the like, are useable. Further, while I suggest high alumina brick of the type disclosed in United States Patent No. 3,067,050 as best, other burned, high alumina brick of industry can be used. Further, while I have suggested the direct bonded, high purity, magnesia-chrome ore system of United States application Ser. No. 212,992 (identified above) as the preferred basic shape, it should be understood that other burned chrome ore-magnesia and magnesia-chrome ore shapes of good quality and dimensional tolerance can be used. And yet further, while I have suggested the unimpregnated, burned, magnesite shape of United States Patent No. 3,141,790 as the preferred high MgO brick, it should be understood that other good quality burned magnesia shapes can be used.

While I have shown as preferred a ring construction in both walls, other arrangements, such as sloped spiral courses, can also be used.

Having thus described the invention in detail and with sufficient particularity as to enable those skilled in the art to practice it, what is desired to have protected by Letters Patent is set forth in the following claims.

I claim:
1. An induction furnace consisting essentially of an outer metal shell in the form of an open-topped tubular vessel, a primary coil disposed adjacent the interior surfaces of said shell, and a composite lining of refractory material, said refractory lining consisting essentially of a plurality of preformed refractory shapes, a first group of said refractory shapes forming a wall about the interior of said outer shell contiguous to said primary coil, a second group of said refractories forming a second wall contiguous to said first wall, the preformed shapes of said second wall being arranged to substantially eliminate continuous direct communication between joints in the first and second wall, said preformed refractory shapes in both walls having substantially parallel top and bottom larger flat faces, opposite cylindrically curved sides of substantially equal radius of curvature but respectively concave and convex and arcuate ends respectively concave and convex, said shapes being laid on one of their larger flat faces, said ends being mated with adjacent shapes to provide an interlocking structure, and additional refractory forming a plurality of successive and contiguous layers across the bottom of said shell, an uppermost of said bottom courses constructed of preformed refractory shapes and arranged to cooperate with said second wall to form an open-topped, refractory-lined well for containing molten metal.

2. The furnace of claim 1 in which the second wall is constructed of burned, high alumina shapes.

3. The furnace of claim 1 in which the second wall is constructed of burned, basic refractory shapes.

4. The furnace of claim 1 in which the first and second walls are fabricated of mineralogically dissimilar, burned refractory shapes.

5. The furnace of claim 1 in which the uppermost of the bottom courses rests on a compatible, rammed, refractory base.

References Cited

UNITED STATES PATENTS

| | | | |
|---|---|---|---|
| 2,650,255 | 8/1953 | Hogël et al. | 13—27 |
| 3,140,333 | 7/1964 | Tredennick et al. | 266—43 |
| 3,269,070 | 8/1966 | Stoy | 52—249 |
| 3,347,972 | 10/1967 | Renkey | 13—35 |

BERNARD A. GILHEANY, *Primary Examiner.*

R. N. ENVALL, JR., *Assistant Examiner.*